May 3, 1932.  F. A. SMITH  1,856,933
SPARE WHEEL LOCK
Filed Jan. 18, 1930
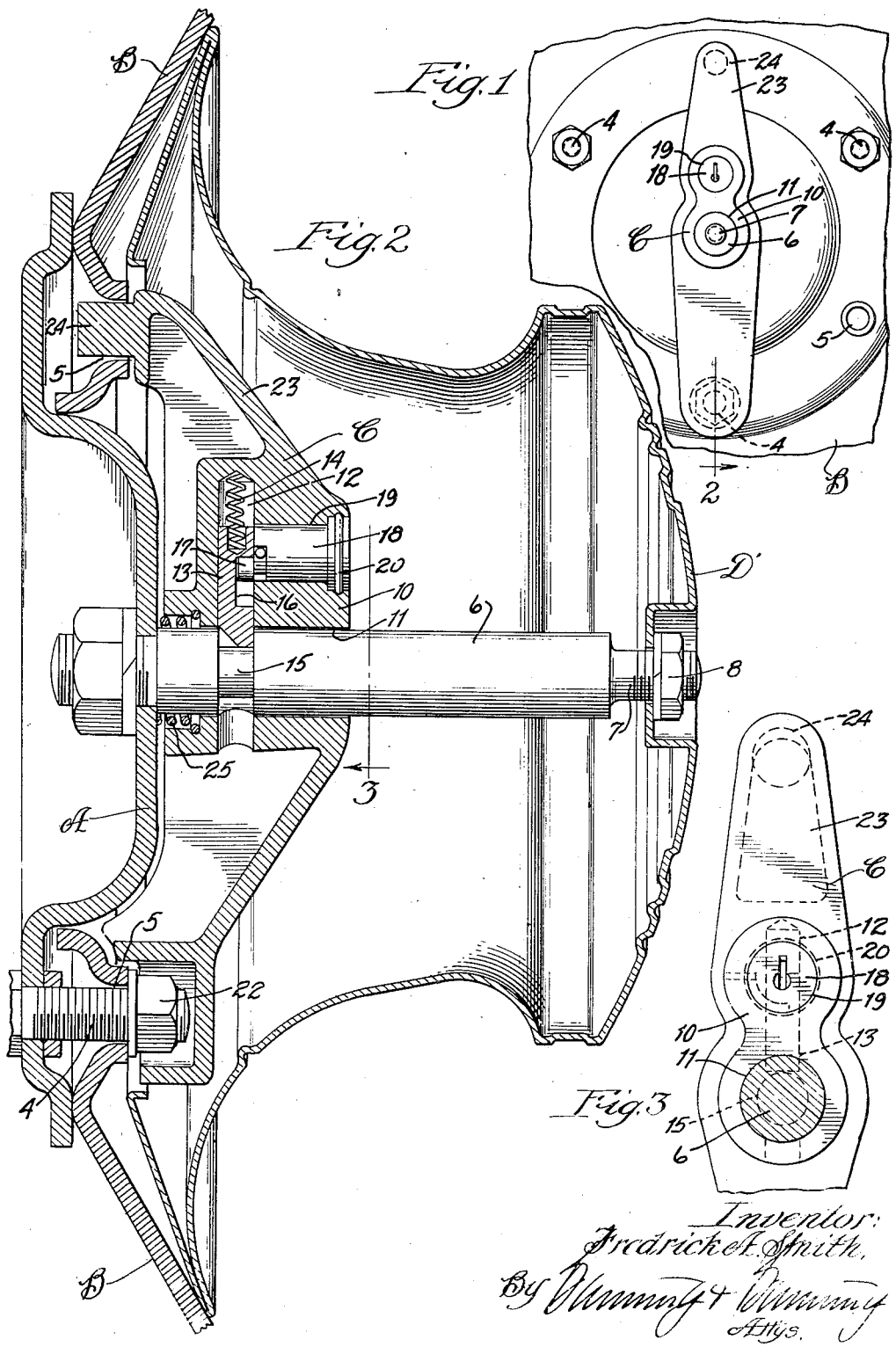

Patented May 3, 1932

1,856,933

UNITED STATES PATENT OFFICE

FREDRICK A. SMITH, OF WAUKEGAN, ILLINOIS, ASSIGNOR TO OAKES PRODUCTS CORPORATION, OF NORTH CHICAGO, ILLINOIS, A CORPORATION OF MICHIGAN

SPARE WHEEL LOCK

Application filed January 18, 1930. Serial No. 421,693.

This invention relates to a spare wheel lock, and more particularly to a lock for securing a spare wheel to the carrier therefor. It is common practice to mount such a wheel upon the carrier with the aid of one or more bolts, and I aim in the present construction to replace or cover one or more of these securing bolts by locked means which extend from a central stud on the wheel carrier.

An exemplification of my invention is suggested in the accompanying drawings, wherein—

Figure 1 is a fragmentary view in elevation of the lock applied to a wheel having its dust cap removed;

Fig. 2 is a vertical sectional view taken as indicated by the line 2 of Fig. 1 showing parts of the wheel carrier, a disc wheel mounted thereon, and the dust cap secured in place; and Fig. 3 is a sectional view taken as indicated by the line 3 of Fig. 2.

Mounted upon an automobile in any suitable manner is a wheel carrier A having a plurality of attaching bolts 4 positioned to correspond with openings 5 in a spare wheel B. Extending centrally from the wheel carrier is a rigidly mounted stud 6, upon which is releasably placed a lock designated generally C. The outer end 7 of the stud is reduced and threaded for receiving a cap D held in place by a nut 8.

The lock C, as shown, may comprise a body 10 having a bore 11 through which is extended the stud. In transverse relation to this bore is a smaller bore 12 in which is slidably fitted a bolt 13 acted upon by a spring 14 which urges the bolt forward into engagement within an annular groove 15 in the stud. The locking bolt is provided with a groove or slot 16 wherein is disposed a pin 17 mounted eccentrically upon a lock cylinder 18. This cylinder is fitted into a bore 19 of the lock body where it is held by a ring 20.

Extending in opposite directions from the lock body is an arm 23 having on one end a boss 24 so disposed as to cover one of the openings 5 in the spare wheel B. A coil spring 25 inserted within a chamber surrounding the stud exerts a thrust on the lock body such as to prevent its rattling against the adjacent parts. The opposite arm end may be similarly formed, or as shown in Fig. 2, it may be socketed to enclose the head of one of the securing bolts 4, or the nut 22 applied thereto.

The nut 8 is first removed, then the dust cap D, preliminary to demounting of the wheel. With the aid of the proper key the lock cylinder is operated to retract the locking bolt, following which the lock body and its two arms are releasable from the stud. The securing nuts are then removed from the bolts 4, leaving the wheel free to be lifted from the carrier. With the parts applied in place, as shown in Fig. 2, the wheel is locked in position upon the carrier, and access to such of the attaching bolts as are protected by the arms extended from the lock is effectually prevented.

I claim:

The combination with a spare wheel carrier having securing bolts and a spare wheel with holes corresponding in position to the bolts, of a stud projecting from the carrier, a lock body fitted upon the stud and having radially projecting arms integral therewith, one arm having a socket at its end to receive one of the bolts securing the spare wheel to the carrier and the other arm having a lug for entering the registering holes of the carrier and wheel at another point of the wheel, and means for releasably securing the lock body upon the stud.

In testimony whereof, I have hereunto set my hand this 15th day of January, 1930.

FREDRICK A. SMITH.